US005921672A

United States Patent [19]

Dobler et al.

[11] Patent Number: 5,921,672

[45] Date of Patent: Jul. 13, 1999

[54] HEADLIGHT FOR VEHICLE

[75] Inventors: Karl-Otto Dobler, Reutlingen; Jan Fischer, Tübingen, both of Germany

[73] Assignee: Robert Bosch GmbH, Stuttgart, Germany

[21] Appl. No.: 08/654,273

[22] Filed: May 28, 1996

[30] Foreign Application Priority Data

May 30, 1995 [DE] Germany ........................... 195 19 654

[51] Int. Cl.⁶ ........................................................ B60Q 1/00

[52] U.S. Cl. .......................... 362/538; 362/266; 362/267; 362/516; 362/509

[58] Field of Search ............................... 362/61, 80, 266, 362/267

[56] References Cited

U.S. PATENT DOCUMENTS

| | | | |
|---|---|---|---|
| 3,742,206 | 6/1973 | Summa | 240/10.1 |
| 5,113,320 | 5/1992 | Haydu | 362/61 |
| 5,132,881 | 7/1992 | Wakimizu et al. | 362/61 |
| 5,169,224 | 12/1992 | Segoshi et al. | 362/61 |
| 5,180,218 | 1/1993 | Ohshio | 362/61 |
| 5,243,501 | 9/1993 | Makita et al. | 362/61 |
| 5,285,358 | 2/1994 | Watanabe et al. | 362/61 |
| 5,521,798 | 5/1996 | Bertling et al. . | |
| 5,546,284 | 8/1996 | Harada et al. | 362/61 |
| 5,611,612 | 3/1997 | Choji et al. | 362/61 |
| 5,647,659 | 7/1997 | Mori | 362/66 |

FOREIGN PATENT DOCUMENTS

4209943 C1 1/1993 Germany .

*Primary Examiner*—Ira S. Lazarus
*Assistant Examiner*—David Lee
*Attorney, Agent, or Firm*—Michael J. Striker

[57] ABSTRACT

A headlight for a vehicle has a housing, a cover member which together with the housing at least partially limits an inner chamber, a color shutter arranged in the inner chamber so that during observation through the cover member the headlight at least in a turned-off condition has a colored appearance, the shutter being arranged near a lower edge region of the housing and at least partially covering an inner side of the housing.

7 Claims, 2 Drawing Sheets

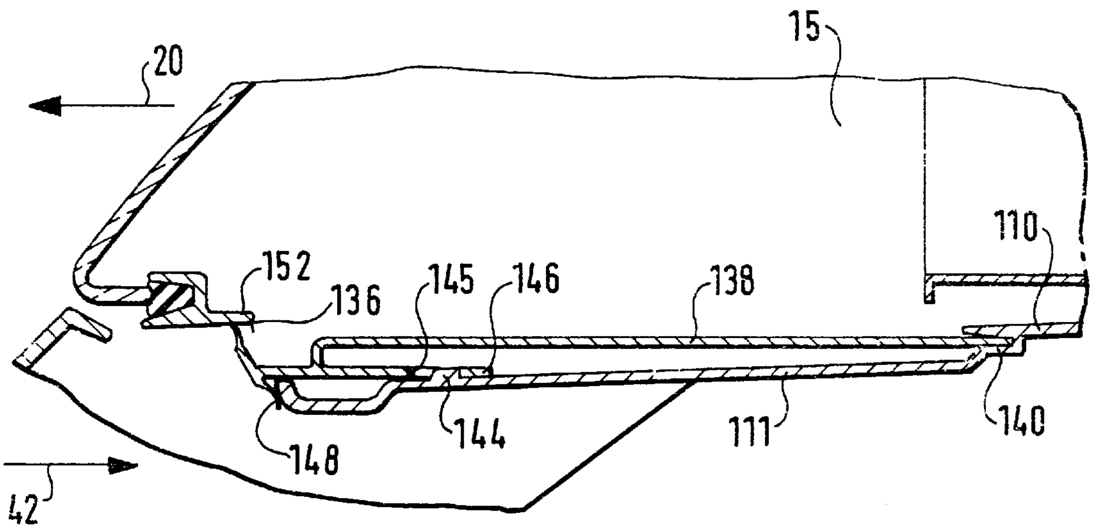
FIG. 2
FIG. 3
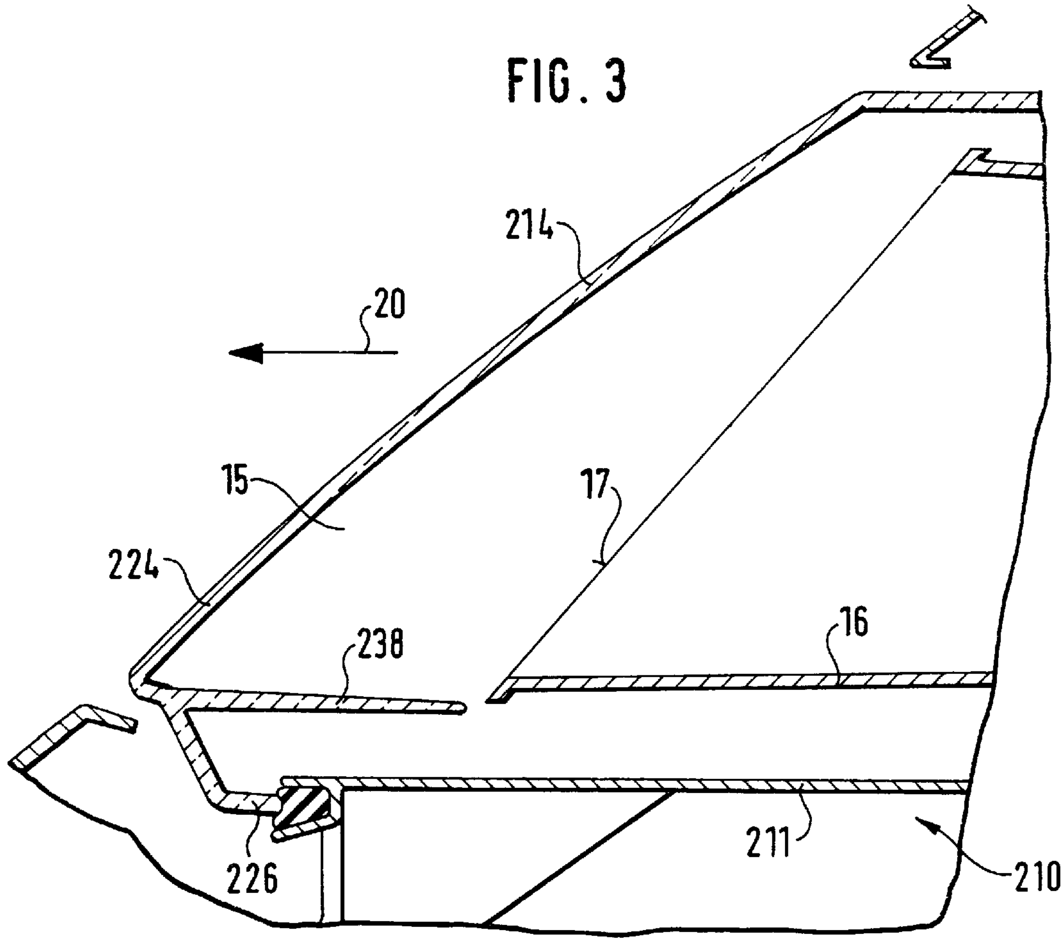

HEADLIGHT FOR VEHICLE

BACKGROUND OF THE INVENTION

The present invention relates to headlights for vehicles.

One of such headlights is disclosed for example in the German document DE 42 09 943 C1. The headlight has an inner space which is at least partially limited by a housing and a light permeable cover member, and in which a color shutter is arranged. Because of the shutter, a color image is produced during observation of the headlight through the cover member in turned off condition. The shutter is formed as a cross shutter including two shutter parts. One of the shutter parts is arranged in a horizontal central plane, while another shutter part is arranged in a vertical central plane of the headlight. This headlight has the disadvantage that, because of the arrangement of the shutter parts, a part of the light produced by the light source and reflected by the reflector is screened. Moreover, the shutter is inserted during assembly of the headlight and subsequently is no longer accessible.

SUMMARY OF THE INVENTION

Accordingly, it is an object of the present invention to provide a headlight for a vehicle, which avoids the disadvantages of the prior art.

In keeping with these objects and with others which will become apparent hereinafter, one feature of the present invention resides, briefly stated, in a headlight in which the shutter is arranged at least close to a lower edge region of a housing and covers at least partially an inner side of the housing.

When the headlight is designed in accordance with the present invention, it has the advantage that the shutter does not cause any light losses.

In accordance with another advantageous feature of the present invention, the shutter is formed of one piece with the cover member and extends from the latter in the inner chamber. With this construction, the shutter can be produced in a simple manner.

In accordance with a further feature of the present invention, the cover member has a circumferential edge which projects opposite to the light outlet direction, and the shutter is arranged in this edge. With this construction a subsequent insertion and an exchange of the shutter after the assembly of the headlight becomes possible.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 2 is a view showing a portion of the inventive headlight with a shutter in accordance with a second embodiment of the present invention; and FIG. 3 is a view showing a portion of the inventive headlight with a shutter in accordance with a third embodiment of the present invention.

DESCRIPTION OF PREFERRED EMBODIMENTS

Figure 1:
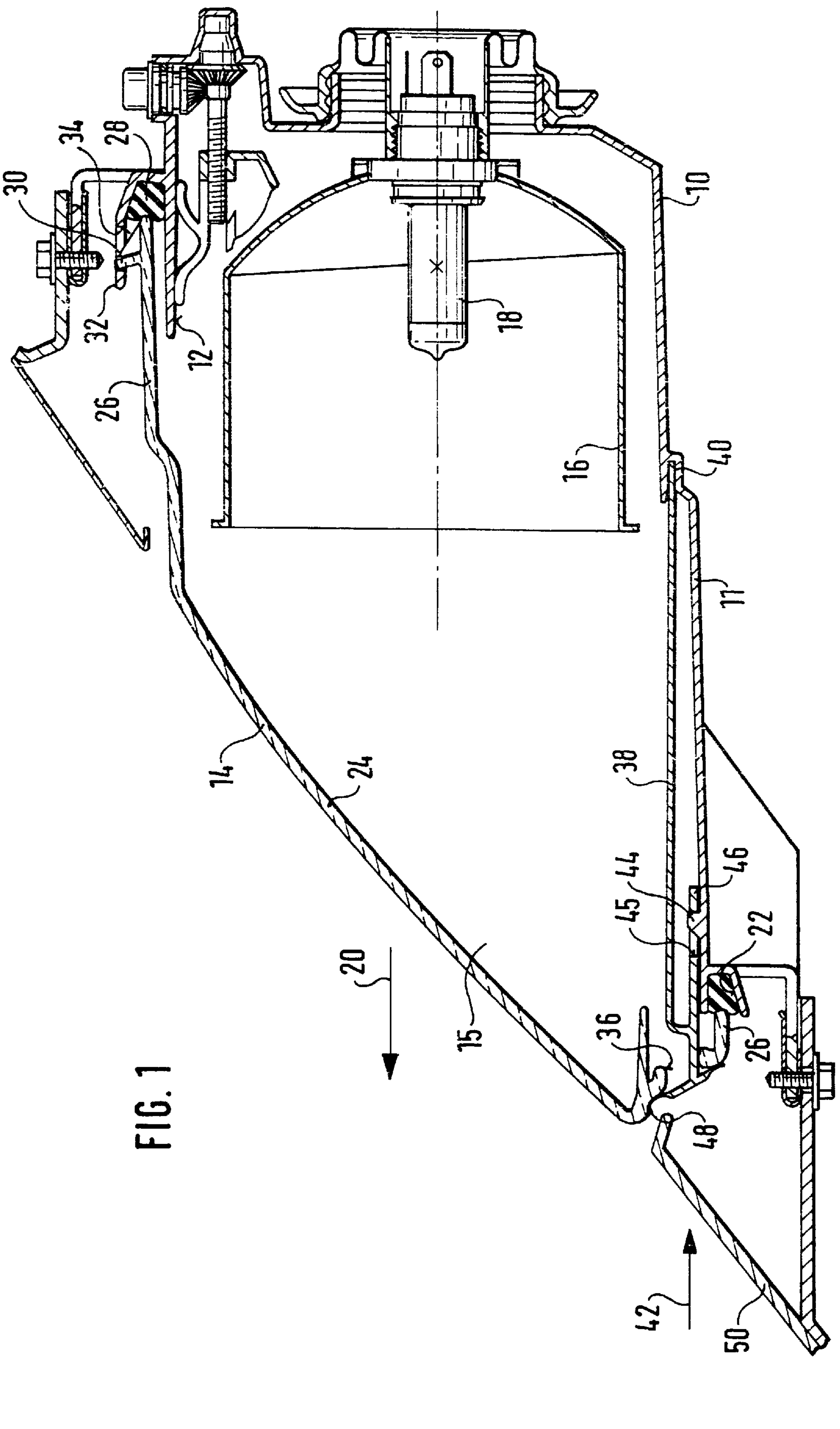
FIG. 1 is a view showing a headlight for a vehicle in accordance with the present invention, in a vertical longitudinal section and with a shutter in accordance with a first embodiment.

A headlight for vehicles, in particle for motor vehicles shown in FIGS. 1–3 has a housing 10 provided with a light outlet opening 12 which is covered by a light permeable cover member 14. An inner chamber 15 is limited by the housing 10 and the cover member 14. At least one reflector 16 is adjustably arranged in the inner chamber and provided with a light source 18. The housing 10 has a circumferential groove 22 provided on its front edge as considered in the light outlet direction. The cover member 14 has a main region 24 which is arranged transversely to the light outlet direction 20, and a circumferential edge 26 which is connected with the main region and faces opposite to the light outlet direction 20. The edge 26 of the cover member 14 is arranged in the groove 22 on the housing 10 and is held arrestingly on the housing 10. An elastic sealing element 28 can be arranged in the groove 22, and the edge 26 of the cover member 14 can be inserted in the sealing element.

The arresting connection of the cover member 14 with the housing 10 can be formed for example by several arresting projections 30 extending outwardly from the edge 26 of the cover member 14, as well as corresponding springy arm 32 arranged on the housing 10 and provided with openings 34. The arresting projections 30 engage in the openings 34. The cover member 14 can be mounted also in another manner on the housing 10, for example glued or connected by clamps. The cover member 14 can be composed of glass or synthetic plastic material. It can be formed smooth or provided with optical elements which are arranged at least in the main region 24 for deviation of the light reflected by the reflector 16.

In the first embodiment shown in FIG. 1, the cover member 14 has a slot-like opening which is formed on a lower edge region on a transition wall located between the main region 24 and the circumferential region 26 and inclined downwardly opposite to the light outlet direction 20. The opening 36 extends over the whole horizontal width of the cover member. A shutter 38 is insertable into the inner chamber 15 of the headlight through the opening 36. It is substantially flat and covered by the inner side of the lower wall 11 of the housing 10. The shutter 38 is displaceably guided on its region arranged in the inner chamber 15, on a guide 40 of the housing 10 along its insertion direction 42.

The guide 40 has two walls arranged lower one another, and the shutter 38 is arranged between the walls. The shutter 38 is mountable on the housing 10, for example by an arresting connection. An arresting projection 44 projects from the wall 11 of the housing 10 into the inner chamber 15, and an arm 46 of the shutter 18 which is provided with an opening 45 is arrestable on it transversely to the insertion direction 42 of the shutter 38. The arm 46 of the shutter 38 is arranged preferably between the shutter 38 and the lower wall 11 of the housing 10. Therefore it is not visible during observation through the cover member 14. The shutter 38 can be mountable outside of the inner chamber 15, in particular mountable releasably, so that it can be again removed.

The shutter 38 has a flange 48 which abuts against the outer side of the cover member 14 which surrounds the opening 36 outside the inner chamber 15. The flange 48 is elastically deformable and provides a sealing of the opening 36, so that no dirt and no moisture can penetrate into the inner chamber 15. Alternatively, the flange 48 can be also formed rigidly, and an elastic sealing element can be clamped between the flange and the outer side of the cover member 14. The lower edge region of the cover member 14 with the opening 36 as well as the flange 48 of the shutter 38, is coverable by a chassis part 50 when the headlight is mounted on the vehicle, and therefore is not visible. The chassis part 50 can be formed as a flap which is removable for insertion of the headlight and then mountable again to cover the opening 36.

The shutter 38 can be painted or paint coated or varnish coated. Therefore, at least in a turned off condition of the headlight the shutter it has a colored appearance. The shutter 38 is arranged at least near the lower wall 11 of the housing 10 and at least partially covers its inner side. Therefore, during observation inclinedly from above, not the inner side of the lower wall 11 is visible, but instead the color shutter 38 and therefore the headlight has correspondingly a colored appearance. The shutter does not affect in any way the light beam which is reflected by the reflector 16 and exits the headlight. The shutter 38 can be provided subsequently and selectively, since it suffices to insert it from outside through the opening 36. The shutter 38 can be also exchanged by a shutter 38 having another color in a simple manner. When no shutter 38 is provided, the opening 36 can be closed by a cover. The shutter 38 can be formed also so that additionally the inner side of the lower wall 11 of the housing at least partially covers also the inner side of one or both lateral walls of the housing 10 and in some cases also the inner side of the upper wall of the housing 10.

FIG. 2 shows a portion of the headlight with a shutter 138 in accordance with a second embodiment of the present invention. The substantial construction of the headlight here is the same as in the first embodiment, and identical parts are identified with the same reference numerals. The shutter 138, as in the first embodiment, is insertable from outside into the inner chamber 15. However, in deviation from the first embodiment, it is insertable through an opening 136 into the housing 110. The slot-shaped opening 136 is arranged in a wall 152 which extends, starting from the lower wall 11 of the housing 110, inclined in the light outlet direction upwardly. It is arranged on the front side of the housing 110 and extends over substantially the whole horizontal width of the housing 110. The shutter 138 is displaceably guided in the housing 110 in a guide 140 along the insertion direction 42 and is mounted in the housing 110, for example analogously to the first embodiment by means of an arresting connection.

A spring arm 146 with an opening 145 projects from the shutter 138 in the inner chamber 15. It is arrestable on an arresting projection 144 extending from the housing 110 into the inner chamber 15. The shutter 138 has a flange 148 abutting against the outer side of the housing 110 which surrounds the outer side of the inner chamber 15 on the opening 136. The flange 148 can be either elastically deformable for sealing of the opening 136 or it can be rigid. Then an additional elastic element for sealing the opening 136 is provided. Alternatively, the opening through which the shutter 138 is insertable can be arranged on the rear side of the housing 110, and the shutter 138 can be displaceable when opposite to the light outlet direction 20 and the inner chamber 15. The wall 152 of the housing 110 with the opening 136 and the flange 148 of the shutter 138 can be covered, as in the first embodiment, by a chassis part 50 of the vehicle.

FIG. 3 shows a portion of the headlight with the shutter 238 in accordance with a third embodiment of the invention. The basic construction of the headlight corresponds to the basic construction of the first embodiment. The shutter 238 is formed of one piece with the cover member 214 as a wall projecting from the cover member 214 near the lower edge of the housing 210 into the inner chamber 15. The shutter 238 can be arranged above the lower portion of the circumferential edge 226 of the cover member 214 and can extend, starting from the main region 224 of the cover member 214, opposite to the light outlet direction 20 to the vicinity of the front edge 17 of the reflector 16. The shutter 238 is substantially light-impermeable, or can be paint coated or varnish coated or provided with the desired color by corresponding painting of the shutter region 238 of the cover member 214. The shutter 238 at least partially covers the lower wall 211 of the housing 210, and the headlight is visible during observation through the cover member 214 as in the color of the shutter 238. The shutter 238 can be formed additionally in the lateral edge region and/or upper edge region of the cover member 214 inside the circumferential edge 226. Therefore, an observer sees not the inner side of the housing 210 which is dark, but instead sees the color shutter 238.

It will be understood that each of the elements described above, or two or more together, may also find a useful application in other types of constructions differing from the types described above.

While the invention has been illustrated and described as embodied in a headlight for a vehicle, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by letters patent is set forth in the appended claims:

1. A headlight for a vehicle, comprising a housing; a cover member which together with said housing at least partially limits an inner chamber; a color shutter arranged in said inner chamber so that during observation through said cover member the headlight at least in a turned-off condition has a colored appearance, said shutter being arranged near a lower edge region of said housing and at least partially covering an inner side of said housing, said cover member having an opening, said shutter being insertable into said inner chamber through said opening.

2. A headlight for a vehicle, comprising a housing; a cover member which together with said housing at least partially limits an inner chamber; a color shutter arranged in said inner chamber so that during observation through said cover member the headlight at least in a turned-off condition has a colored appearance, said shutter being arranged near a lower edge region of said housing and at least partially covering an inner side of said housing, said cover member and said housing forming two members, at least one of said members being provided with an opening through which said shutter is insertable into said inner chamber, said opening being arranged on a front side of said cover member; and further comprising a region which is provided with said opening and coverable by a chassis part of the vehicle when the headlight is mounted in the vehicle.

3. A headlight for a vehicle, comprising a housing; a cover member which together with said housing at least partially limits an inner chamber; a color shutter arranged in said inner chamber so that during observation through said cover member the headlight at least in a turned-off condition has a colored appearance, said shutter being arranged near a lower edge region of said housing and at least partially covering an inner side of said housing, said cover member and said housing constitute two elements, at least one of said elements being provided with an opening having a surrounding edge, said shutter having a flange which abuts against said edge outside said inner chamber.

4. A headlight as defined in claim 3, wherein said flange is at least partially elastically deformable for sealing said opening.

5. A headlight for a vehicle, comprising a housing; a cover member which together with said housing at least partially limits an inner chamber; a reflector arranged in said inner chamber; a color shutter arranged in said inner chamber so that during observation through said cover member the headlight at least in a turned-off condition has a colored appearance, said shutter being arranged near a lower edge region of said housing and at least partially covering an inner side of said housing, but does not cover said reflector in a light outlet direction.

6. A headlight as defined in claim 5, wherein said shutter is releasably mounted on said housing.

7. A headlight as defined in claim 5, wherein said housing is provided with a guide, said shutter being displaceably guided in said guide along an insertion direction of said shutter into said inner chamber.

* * * * *